(12) United States Patent
Dourra et al.

(10) Patent No.: US 7,632,215 B2
(45) Date of Patent: Dec. 15, 2009

(54) TRANSMISSION DOWNSHIFT SWAP-SHIFT CONTROL

(75) Inventors: Hussein Dourra, Bloomfield, MI (US); Javed A. Dada, Lapeer, MI (US); Teddy Siy, Royal Oak, MI (US); Ali Mourtada, Dearborn Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 378 days.

(21) Appl. No.: 11/760,139

(22) Filed: Jun. 8, 2007

(65) Prior Publication Data

US 2008/0132375 A1    Jun. 5, 2008

Related U.S. Application Data

(60) Provisional application No. 60/868,669, filed on Dec. 5, 2006.

(51) Int. Cl.
*B60W 10/02* (2006.01)
*B60W 10/04* (2006.01)
*F16H 31/00* (2006.01)

(52) U.S. Cl. ............... 477/174; 477/175; 477/176; 477/180; 475/118; 475/121

(58) Field of Classification Search ......... 477/174–176, 477/180; 475/116, 118, 121
See application file for complete search history.

(56) References Cited

U.S. PATENT DOCUMENTS

| | | | |
|---|---|---|---|
| 4,086,827 A | 5/1978 | Chana | |
| 4,875,391 A | 10/1989 | Leising et al. | |
| 4,905,545 A | 3/1990 | Leising et al. | |
| 4,935,872 A | 6/1990 | Benford et al. | |
| 5,038,636 A * | 8/1991 | Vukovich et al. | ........... 477/148 |
| 5,113,343 A * | 5/1992 | Hunter et al. | ........... 701/51 |
| 5,115,698 A | 5/1992 | Leising et al. | |
| 5,211,080 A | 5/1993 | Leising et al. | |
| 5,295,924 A | 3/1994 | Beim | |
| 5,304,981 A | 4/1994 | Leising et al. | |
| 5,468,198 A | 11/1995 | Holbrook et al. | |
| 5,642,283 A | 6/1997 | Schulz et al. | |
| 5,809,442 A | 9/1998 | Schulz et al. | |
| 5,835,875 A | 11/1998 | Kirchhoffer et al. | |
| 6,079,288 A | 6/2000 | Holbrook et al. | |
| 6,149,543 A | 11/2000 | Breen | |
| 6,277,051 B1 | 8/2001 | Yeo | |
| 6,301,538 B1 | 10/2001 | Kirchhoffer et al. | |
| 6,422,969 B1 | 7/2002 | Raghavan et al. | |
| 6,626,786 B2 * | 9/2003 | Hayabuchi et al. | .......... 475/127 |

(Continued)

*Primary Examiner*—Tisha D Lewis
(74) *Attorney, Agent, or Firm*—Ralph E. Smith

(57) ABSTRACT

An automatic transmission for a vehicle includes a main box controlled using a series of clutches, and an underdrive assembly controlled using a series of clutches and at least one overrunning clutch. In achieving a double-swap downshift from a first transmission "gear" employing a first main box clutch and a first underdrive assembly clutch, to a second transmission "gear" employing a second main box clutch and a second underdrive assembly clutch, a controller delays release of the first main box clutch until after the second underdrive assembly clutch has been prefilled, and fully applies the second underdrive assembly clutch only after slip has been detected in both the main box and the underdrive assembly. Additionally, the controller fully applies the second main box clutch only after the second underdrive assembly clutch has itself been fully applied.

6 Claims, 2 Drawing Sheets

U.S. PATENT DOCUMENTS

| | | |
|---|---|---|
| 6,773,370 B2 | 8/2004 | Martyka et al. |
| 6,893,379 B2 | 5/2005 | Sakamoto et al. |
| 6,929,583 B2 | 8/2005 | Ayabe et al. |
| 6,931,315 B2 | 8/2005 | Ayabe et al. |
| 7,179,189 B2 * | 2/2007 | Dourra et al. ............... 475/123 |
| 2008/0081736 A1 * | 4/2008 | Chen .......................... 477/116 |

* cited by examiner

| GEAR | RATIO | A | B | C | D | E | F | G | H |
|---|---|---|---|---|---|---|---|---|---|
| 1 | 3.92 | X | | | | X | X | | X |
| 2 | 2.70 | X | | | | X | | X | |
| 3 | 2.17 | X | | | X | | X | | X |
| 4 | 1.38 | X | X | | | | X | | X |
| 4' | 1.49 | X | | | X | | | X | |
| 5 | 0.95 | X | X | | | | | X | |
| 6 | 0.66 | | X | | X | | | X | |
| REV | -3.05 | | | X | | X | X | | |

US 7,632,215 B2

TRANSMISSION DOWNSHIFT SWAP-SHIFT CONTROL

This application claims the benefit of U.S. Provisional Application No. 60/868,669, filed Dec. 5, 2006.

FIELD OF THE INVENTION

The invention relates generally to a method for controlling a vehicle automatic transmission equipped with both a main gear box and an underdrive assembly.

BACKGROUND OF THE INVENTION

Generally, conventional automatic transmissions include a torque converter to transfer engine torque from an engine to an input of a main gearset that includes a plurality of interconnected planetary gearsets. A plurality of fluid-pressure-operated drive of brake clutches and/or brake bands (collectively "engagement elements") are typically connected to the individual elements of the planetary gearsets and are applied or released in various combinations to thereby select a desired transmission gear ratio. At least one freewheeling or overrunning clutch often operates the clutches and/or brake bands to "shift" the transmission from one selected transmission gear ratio to another selected transmission gear ratio.

In operation, such conventional automatic transmission ate sequentially shifted up and down by the controller through the several available transmission gear ratios by initiating "single swap" events characterized by releasing one applied drive or brake clutch and applying another idle clutch. Preferably, the controller can shift the transmission up and down "through the gears" in such a manner that the vehicle's operator does not notice or feel the gear shifts, by each time applying and releasing a single pair of clutches.

Unfortunately, by relying exclusively on "single swap" up-and down-shifting, such conventional transmission suffer from the disadvantage of not being able to use some of the gear ratios that might be available if several drive or brake clutches and/or brake bands were applied and/or released during the shifting event, thereby also limiting the drivability, performance, and fuel economy of the vehicle's powertrain.

SUMMARY OF THE INVENTION

A method is provided for controlling an automatic transmission for a vehicle, wherein the transmission includes an input shaft, an output shaft, a first gearset including a first plurality of gears, a second gearset including a second plurality of gears, and a series of engagement elements or clutches operatively associated with one or the other of the gearsets and selectively applied or released to thereby operatively couple the input shaft to the output shaft through selected gears of the first and second gearsets, respectively, to thereby achieve a plurality of desired transmission speed ratios between the input and output shafts. Specifically, a method is provided for directly downshifting the transmission from a first transmission speed ratio characterized by engagement of one clutch of the first gearset and one clutch of the second gearset, the one clutch of the second gearset being an overrunning clutch, to a second transmission speed ratio characterized by engagement of another clutch of the first gearset and another clutch of the second gearset, to thereby achieve a "double-swap" downshift of the transmission.

In accordance with an aspect of the invention, the method includes, in series, the steps of (a) partially releasing the one clutch of the first gearset until the one clutch of the first gearset carries a slightly greater torque than necessary to couple the input shaft to the output shaft through the selected gears of the first gearset; (b) further releasing the one clutch of the first gearset until the one clutch of the first gearset begins to slip; (c) partially applying the other clutch of the second gearset until the one clutch of the second gearset begins to slip (overrun); (d) maintaining the partial application of the other clutch of the second gearset until a target ratio of the second gearset achieved; (e) fully applying the other clutch of the second gearset; and (f) fully applying the other clutch of the first gearset and fully releasing the one clutch of the first gearset.

In an exemplary embodiment, the method further includes partially reapplying the one clutch of the first gearset between steps (e) and (f), as well as preapplying, or "prefilling," the other clutch of the second gearset, preferably before step (c) and, most preferably, before step (a). The exemplary method also includes preapplying the other clutch of the second gearset before step (f) and, most preferably, before step (b).

The method of the invention advantageously provides a transmission downshift that features a reduced jerk term while further ensuring that the speed change of the second gearset occurs during the speed change of the first gearset.

Other object, features, and advantages of the present invention will be readily appreciated upon a review of the subsequent description of an exemplary method used in connection with an exemplary vehicle transmission, and the appended claims, taken in conjunction with the accompanying Drawing.

DETAILED DESCRIPTION OF THE INVENTION

Figures 1, 2:
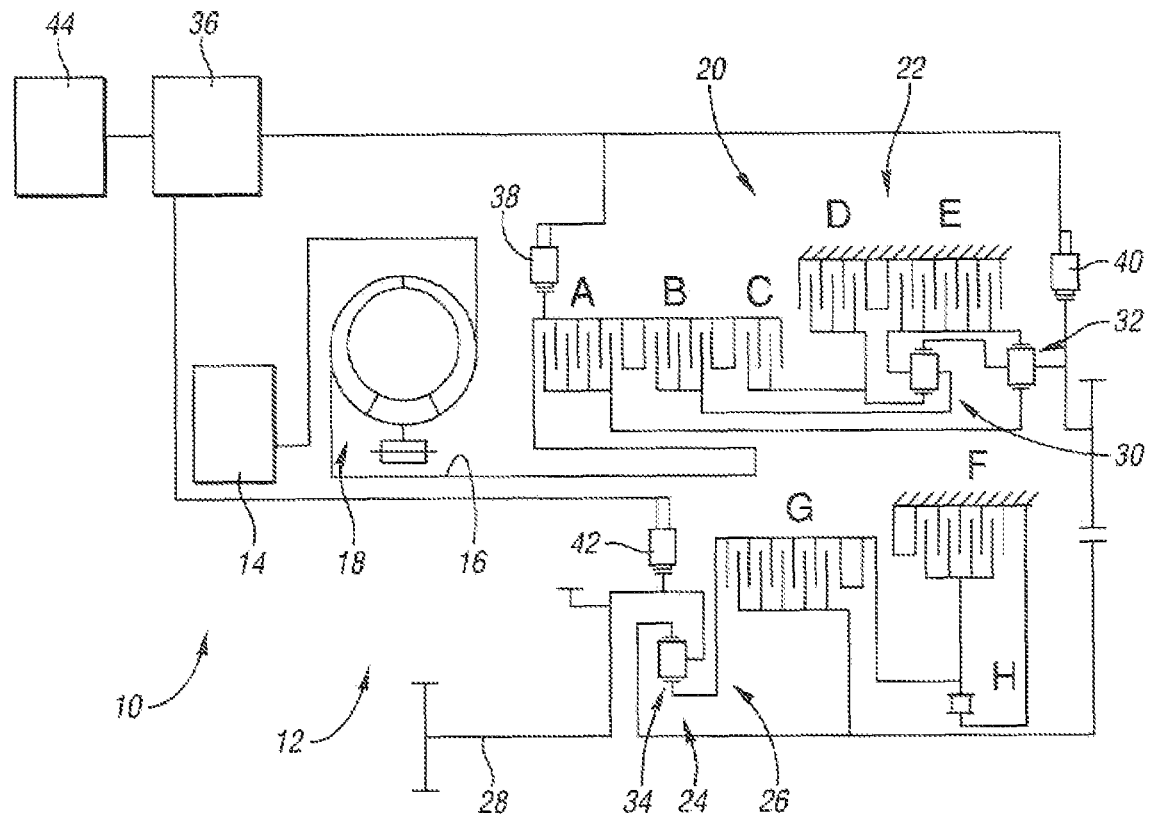
FIG. 1 is a schematic representation of a exemplary transmission in accordance with an aspect of the invention.
FIG. 2 is a table showing gear ratio combinations and shift sequences for the transmission of FIG. 1.

An exemplary vehicle powertain 10 including an automatic transmission 12 for use in practicing an exemplary method in accordance with the invention is illustrated schematically in FIG. 1. The powertrain 10 includes an engine 14 coupled to the input shaft 16 of the transmission 12 via a torque converter 18. The transmission 12 includes a main box 20 including a main gearset 22,and an underdrive assembly 24 including a compounder gearset 26. The main box 20 and underdrive assembly 24 including a series of, as will be discussed further below.

While the invention contemplates us of any suitable configuration of gears engagement elements, such as drive clutches and brake clutches, to define the transmission's main gearset 22 and the compounder gearset 26 and selectively achieve a plurality of desired gear ratios with which to drive the transmission's output shaft 28, in the exemplary powertrain 10 shown in FIG. 1, the transmission's main gearset 22 includes a first and second planetary gearests 30,32, and several hydraulically-actuated engagement elements including three drive clutches A,B,C, and two brake clutches D,E (with which to ground one or more gears of the planetary gearsets 30,32 to the main box housing). In the exemplary powertrain 10, the transmission's compounder gearset 26 includes a third planetary gearset 34, several hydraulically-actuated engagement elements including a braking clutch F and a drive clutch G, and an overrunning clutch H.

When the clutches of the main gearset 22 and compounder gearset 26 are selectively applied and released in the combinations shown in FIG. 2, the planetary gearsets 30,32,34 provide the transmission 12 with seven different forward gears an a reverse gear. Specifically, the powertrain 10 includes a controller 36 that receives signals generated by an input shaft speed sensor 38, a transfer speed sensor 40 that monitors a speed of rotation of an output of the main gearset 22, an output shaft speed sensor 42, and vehicle sensors 44 which preferably monitor other vehicle operating information including vehicle speed and operator input, such as braking and accelerator pedal position. While the invention contemplates any suitable manner by which the controller 36 selectively applies the drive and/or braking clutches A-G, in the exemplary powertrain 10, the controller 36 applies a given clutch A-G, by supplying g a pulse-width modulated energizing signal to a solenoid-operated hydraulic fluid supply valve, which in turn controls the amount of torque that can be carried, if at all, by a given one of the clutches A-G. It will be appreciated that the controller chooses the proper gear depending on vehicle conditions such as the shift-program selected by the driver (i.e., Drive, Reverse, Neutral, etc.), the accelerator position, the engine condition, and the vehicle speed.

It will be appreciated that the underdrive assembly's overrunning clutch H carries torque only when the transmission 12 experiences a positive torque, such that, when the transmission 12 experiences negative torque, the overrunning clutch H is "overrun" so as to be effectively disengaged. Thus, for positive torque shifts, clutch F is released as the overrunning clutch H prevents any further relative rotation of the sun gear of the compounder's planetary gearset 34 and, hence, is not involved in the torque exchange during positive-torque shifts.

Referring again to FIGS. 1 and 2, it will be appreciated that upshifting from gear 1 to gear 2 (as defined on FIG. 2), and downshifting from gear 2 back to gear 1, are both achieved with a "single swap," in which the gear ratio of the transmission 12 is changed by "swapping" the underdrive assembly's drive clutch G for its brake clutch F (while the underdrive assembly's overrun clutch H automatically releases). Thus, for example, a gear 1 to gear 2 upshift is achieved as the controller 36 applies drive clutch G, whereupon the underdrive assembly's overrunning clutch H releases automatically as the torque applied by clutch G increases (the controller 36 will also release the underdrive assembly's brake clutch F, but its torque is zero since the overrunning clutch H is carrying all of the torque). After the speed change is complete, and with the underdrive assembly's drive clutch G fully engaged, the transmission 12 has shifted sequentially from gear 1 to gear 2 to achieve a numerically-lover gear ratio, with the upshift being accomplished entirely within the underdrive assembly 24.

From FIGS. 1 and 2, it will be further appreciated that an upshift between gears 2 and 3 is a "double-swap" upshift, meaning that two clutches are released and two different clutches are applied in a coordinated manner to achieve to 2-3 upshift. Specifically, during a 2-3 upshift, the controller 36 begins to release underdrive assembly drive clutch G as it fills and partially applies main box brake clutch D. Once main box brake clutch E has been released to the point at which the main box 20 has begun to "slip," the controller 36 disengages drive clutch G of the underdrive assembly 24 to allow the under assembly 24 to slip (with the brake clutch F later being applied after the 2-3 upshift is complete). A further detailed description of such a double-swap upshift is disclosed in U.S. patent application Ser. No. 11/021,607 filed Dec. 23, 2004, assign to the assignee of the present invention, and published a US 2006/0142106 A1, the disclosure of which is hereby incorporated by reference.

Thus, in the double-swap upshift from gear 2 to gear 3, the release of main box clutch E and the engagement of main box clutch D is timed by the controller 36 such that the exchange between brake clutch E and brake clutch D is slightly overlapped, for example, by adaptively adjusting the duty cycle controlling the hydraulic fluid supply solenoid valve to brake clutch E to maintain some excess torque-carrying capacity until the brake clutch D has enough capacity to hold engine torque, whereupon the main box 20 starts speed change the controller 36 drops the duty cycle for the supply solenoid valve to clutch E to zero to thereby release of disengage brake clutch E. Then, after the speed change has occurred in the main box 20 the controller 36 releases underdrive assembly drive clutch G in the underdrive assembly 24 in order to achieve generally about 40 to 70 milliseconds in an exemplary transmission.

Figure 3:
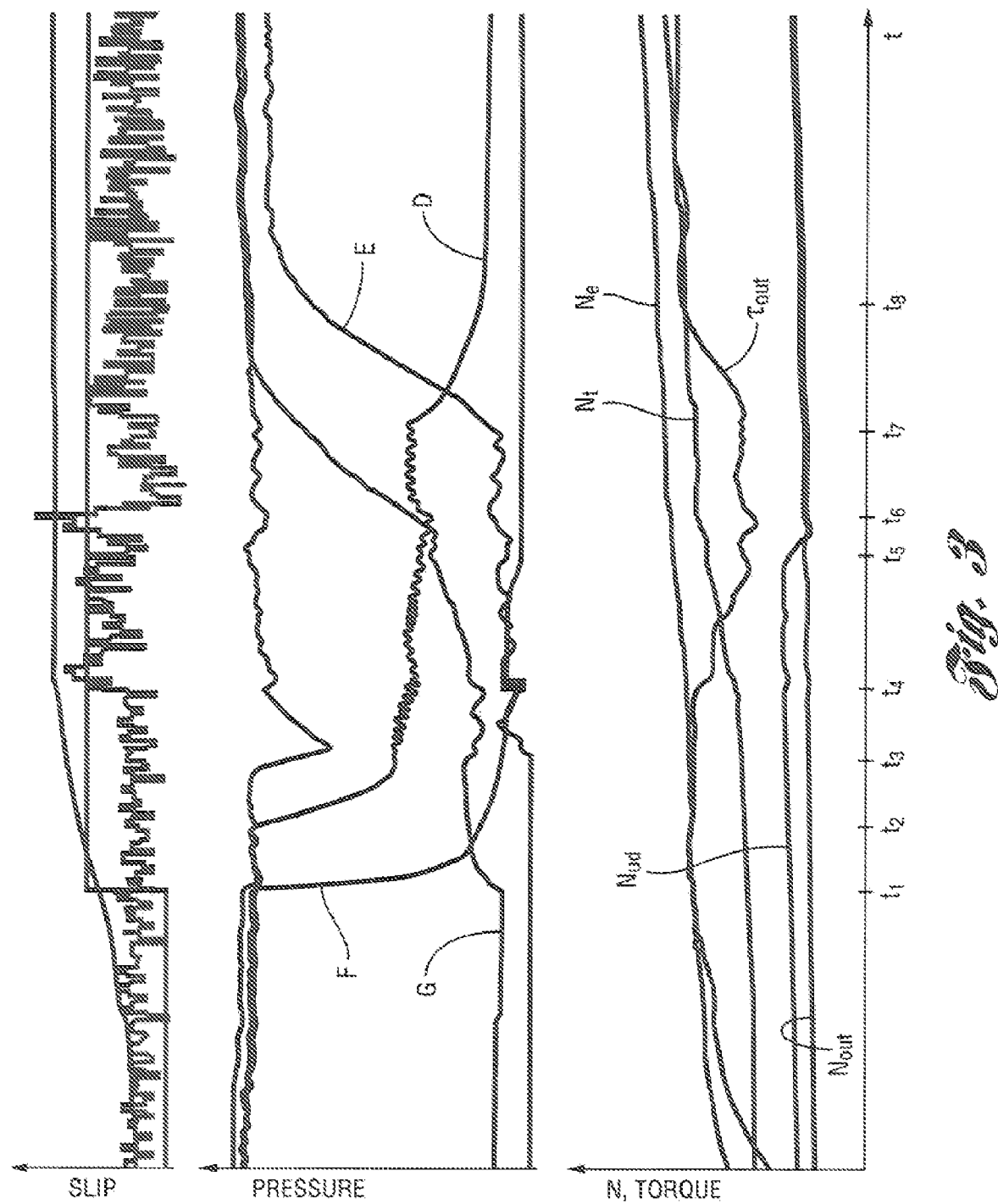
FIG. 3 includes related graphical representations of the clutch and brake application sequence and associated pressure curves, output torque, and speed curves for a double-swap down shift sequence between gear 3 and gear 2, performed in accordance with an aspect of the invention.

Referring to FIG. 3, in an exemplary "double-swap" downshift of the transmission, for example, from gear 3 to gear 2 as shown in FIG. 2, at time $t_1$, the controller 36 initially deenergizes the solenoid supply valve controlling the fluid pressure to underdrive assembly brake clutch F (whereupon the overrunning clutch H continues to hold torque). The controller 36 also energizes the solenoid supply valve controlling the fluid pressure to underdrive assembly drive clutch G, so as to "prefill" the drive clutch G. At time $t_2$, the underdrive assembly drive clutch G has been substantially prefilled, and the controller 36 deeneergizes the solenoid supply valve controlling main box brake clutch D to thereby rapidly decrease or vent the fluid pressure applied to brake clutch D, until a desired pressure is achieved at time $t_3$ which is preferably a calibratable or adaptive value that is slightly above the pressure at which the brake clutch D begins to release or slip. The controller 36 then energizes the solenoid supply valve controlling main box brake clutch D, preferable with a duty cycle that has been adaptively determined so as gently reduced the pressure down to a slip condition, to thereby avoid a high jerk term. Also at roughly time $t_3$, the controller 36 energizes the solenoid supply valve controlling the fluid pressure to main box brake clutch E with a duty cycle sufficient to prefill main box brake clutch E.

At time $t_4$, with a speed change beginning to occur in the main box 20, the underdrive assembly 24 enters a torque-phase duty cycle mode in which the controller 36 begins to slowly increase the duty cycle of the solenoid supply valve controlling underdrive assembly drive clutch G, to thereby raise the fill volume to a predetermined level. In an exemplary embodiment, the controller 36 operates in an open loop mode to achieve predetermined target fill volumes over time, until the underdrive assembly 24 begins to slip.

At time $t_5$, with the main box 20 slipping, and as the underdrive assembly 24 begins to slip, the controller 36 enters a main box "hold flow" mode in which the controller 36 energizes the solenoid supply valve controlling main box brake clutch D, preferably with a duty cycle that has been adaptively determined so as to generate a near-constant level of torque. At the same time, the controller 36 drops the duty cycle for solenoid supply valve controlling underdrive assembly drive clutch G to an inertial phase, wherein the controller 34 achieves a compounder "zero flow" mode to maintain the fluid pressure at which the underdrive assembly 24 slips, i.e., a substantially flat pressure.

At time $t_6$, when the underdrive assembly's output speed $N_{ud}$ equals the target, output speed $N_{out}$, the controller 36 fully energizes the solenoid supply valve controlling underdrive assembly drive clutch G. And, shortly thereafter, at time $t_7$, once the controller 36 has determined that underdrive assembly drive clutch G is "beyond fill," for example, as when the pressure of the drive clutch G is nearly equal to the line (supply) pressure, the controller 36 fully energizes main box brake clutch E while deenergizing main box brake clutch D, to the thereby complete the downshift at time $t_8$.

From the foregoing, it will be appreciated that a double-swap downshift in accordance with the invention advantageously delays release of the first main box clutch until after the second underdrive assembly clutch has been prefilled, with the speed change of the underdrive assembly occurring with little jerk term during the speed change of the main box, and with the second main box clutch being fully applied only after the second underdrive assembly clutch has been fully applied.

While the above description constitutes the preferred embodiment, it will be appreciated that the invention is susceptible to modification, variation and change without departing from the proper scope and fair meaning of the subjoined claims. For example, while a double-swap downshift has been described in connection with downshifting the transmission 10 from gear 3 to gear 2, it will be appreciated that a double-swap downshift from gear 4 to gear 2 will be accomplished in a similar manner.

What is claimed is:

1. A method for downshifting an automatic transmission from a first transmission speed ration characterized by engagement of one clutch of a first gearset and one clutch of a second gearset, the one clutch of the second gearset being an overrunning clutch, to a second transmission speed ratio characterized by engagement of another clutch of the first gearset and another clutch of the second gearset, the method comprising, in series, the steps of:
    (a) partially releasing the one clutch of the gearset until the one clutch of the first gearset carries a slightly greater torque than necessary to couple the input shaft to the output shaft through the selected fears of the first gearset;
    (b) further releasing the one clutch of the first gearset until the one clutch of the first gearset begins to slip;
    (c) partially applying the other clutch of the second gearset until the one clutch of the second gearset begins to slip;
    (d) maintaining the partial application of the other clutch of the second gearset until a target ratio of the second gearset is achieved;
    (e) fully applying the other clutch of the second gearset; and
    (f) fully applying the other clutch of the first gearset and fully releasing the one clutch of the first gearset.

2. The method of claim 1, further including partially reapplying the one clutch of the first gearset between steps (e) and (f).

3. The method of claim 1, further including preapplying the other clutch of the second gearset before step (c).

4. The method of claim 3, wherein the other clutch of the second gearset is preapplied before step (a).

5. The method of claim 1, further including preapplying to other clutch of the second gearset before step (f).

6. The method of claim 5, wherein the other clutch of the second gearset is preapplied before step (b).

\* \* \* \* \*